(12) United States Patent
Sato et al.

(10) Patent No.: US 8,076,447 B2
(45) Date of Patent: Dec. 13, 2011

(54) POLY (ARYLENE SULFIDE) AND PRODUCTION PROCESS THEREOF

(75) Inventors: Hiroyuki Sato, Fukushima (JP); Koichi Suzuki, Fukushima (JP); Hirohito Kawama, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 12/653,623

(22) Filed: Dec. 16, 2009

(65) Prior Publication Data

US 2010/0113739 A1 May 6, 2010

Related U.S. Application Data

(62) Division of application No. 10/589,006, filed as application No. PCT/JP2005/002370 on Feb. 9, 2005, now Pat. No. 7,655,748.

(30) Foreign Application Priority Data

Feb. 12, 2004 (JP) ................. 2004-034397

(51) Int. Cl.
*C08G 75/14* (2006.01)
*C08G 75/00* (2006.01)
*C08G 75/02* (2006.01)

(52) U.S. Cl. ........ 528/388; 528/373; 528/489; 528/492; 528/493; 528/503

(58) Field of Classification Search .................. 528/388, 528/373, 489, 492, 493, 503
See application file for complete search history.

(56) References Cited

U.S. PATENT DOCUMENTS

| | | | |
|---|---|---|---|
| 4,767,841 A | 8/1988 | Goetz et al. | |
| 4,786,711 A | 11/1988 | Senatore et al. | |
| 5,235,034 A | 8/1993 | Bobsein et al. | |
| 5,744,576 A | 4/1998 | Miyahara et al. | |
| 2003/0065131 A1 | 4/2003 | Inoue et al. | |
| 2006/0074219 A1 | 4/2006 | Kawama et al. | |

FOREIGN PATENT DOCUMENTS

| | | |
|---|---|---|
| EP | 0 547 718 A2 | 12/1992 |
| EP | 1 219 665 A2 | 8/2001 |
| JP | 61-228023 | 10/1986 |
| JP | 62-185718 | 8/1987 |
| JP | 62-220522 | 9/1987 |
| JP | 02-160834 | 6/1990 |
| JP | 02-302436 | 12/1990 |
| JP | 04-139215 | 5/1992 |
| JP | 05-271414 | 10/1993 |
| JP | 6-51792 | 6/1994 |
| JP | 6-51793 | 6/1994 |
| JP | 07-286042 | 10/1995 |
| JP | 08-183858 | 7/1996 |
| JP | 08-198965 | 8/1996 |
| JP | 10-045911 | 2/1998 |
| JP | 10-045912 | 2/1998 |
| JP | 10-130388 | 5/1998 |
| JP | 10-265575 | 10/1998 |
| JP | 11-209617 | 8/1999 |
| JP | 2001-040090 | 2/2001 |
| JP | 2001-181394 | 7/2001 |
| JP | 2002-201275 | 7/2002 |
| JP | 2004-244619 | 9/2004 |

*Primary Examiner* — Duc Truong
(74) *Attorney, Agent, or Firm* — Porter, Wright, Morris & Arthur, LLP

(57) ABSTRACT

A poly(arylene sulfide) having properties that a melt viscosity is 1 to 3,000 Pa·s as measured under conditions of a temperature of 310° C. and a shear rate of 1,216 sec$^{-1}$, a pH is 7.0 to 12.0 as measured in a mixed solvent of water/acetone (volume ratio=2/1), a crystallization temperature is at most 220° C. as measured in the course of lowering the temperature of the polymer at a rate of 10° C./min from a molten state, and a whiteness degree is at least 70 as measured in the form of a melt molded or formed product, and a production process thereof.

2 Claims, No Drawings

POLY (ARYLENE SULFIDE) AND PRODUCTION PROCESS THEREOF

This application is a divisional application under 35 USC §121 of U.S. application Ser. No. 10/589,006 filed Aug. 10, 2006 now U.S. Pat. No. 7,655,748, which is a U.S. National Stage of PCT/JP05/02370 filed Feb. 9, 2005, each of which is herein incorporated by reference.

TECHNICAL FIELD

The present invention relates to a poly(arylene sulfide) and a production process thereof, and particularly to a poly (arylene sulfide) excellent in melt stability, low in crystallization temperature and excellent in whiteness degree, and a production process thereof. The poly(arylene sulfide) of the present invention is suitable for use as a material of fibers and the like.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical strength, electrical properties and dimensional stability. The PASs are commonly used in a wide variety of fields such as electrical and electronic equipments and automotive equipments because they can be formed or molded into various kinds of molded or formed products, films, sheets, fibers, etc. by general melt processing techniques including extrusion, injection molding and compression molding.

As a typical production process of a PAS, is known a process, in which a sulfur source is reacted with a dihalo-aromatic compound in an organic amide solvent such as N-methyl-2-pyrrolidone (hereinafter abbreviated as "NMP"). As the sulfur source, is mainly used an alkali metal sulfide. There is also known a method of using, as the sulfur source, an alkali metal sulfide formed by reacting an alkali metal hydrosulfide with an alkali metal hydroxide in situ.

The polymerization reaction of the sulfur source with the dihalo-aromatic compound is a desalting polycondensation reaction to produce a great amount of a salt (i.e., an alkali metal halide) such as NaCl after the reaction. There have therefore been proposed methods for removing a salt such as NaCl by washing the PAS obtained by the polymerization with a washing liquid such as water, an organic solvent, a mixture of water and an organic solvent or water containing a surfactant (for example, Japanese Patent Publication No. 6-86528, Japanese Patent Publication No. 6-57747, Japanese Patent Application Laid-Open No. 4-139215, Japanese Patent Publication No. 4-55445 and Japanese Patent Application Laid-Open No. 10-265575).

On the other hand, There have been proposed production processes of a poly(arylene sulfide), in which a sulfur source and a dihalo-aromatic compound are polymerized in the presence of an alkali metal hydroxide (for example, Japanese Patent Application Laid-Open No. 2-302436, Japanese Patent Application Laid-Open No. 5-271414, Japanese Patent Publication No. 6-51792, Japanese Patent Application Laid-Open No. 2001-181394, Japanese Patent Application Laid-Open No. 2-160834 and Japanese Patent Publication No. 6-51793). According to these production processes, however, it is difficult to set conditions for stably performing the polymerization reaction. In addition, since a great amount of the alkali metal hydroxide is used in these production processes, it is difficult to inhibit side reactions.

Further, since the PASs are generally crystalline polymers poor in melt stability and fast in crystallization speed from a molten state, they have involved such problems that thread breakage is easy to occur upon melt spinning, and physical properties of molded or formed products after melt molding or forming are irregular. In addition, the PASs have also involved a problem that they are easy to be colored under melt processing conditions.

There has thus been proposed a process for producing a molded or formed product excellent in color tone stability by using a PAS having a pH ranging from 5.5 to 8.8 as measured in a mixed solvent of acetone/water (volume ratio=1:2) (for example, Japanese Patent Application Laid-Open No. 11-209617).

In order to obtain a PAS fast in crystallization speed and high in whiteness degree, there has been proposed a production process of a PAS, in which specific reaction conditions are adopted in the process for producing the PAS by reacting an alkali metal sulfide with para- and meta-dihalo-aromatic compounds in an organic amide solvent, and moreover an acid or hydrogen salt is added to a slurry containing the PAS after the reaction to adjust the pH of the slurry to 7.0 to 11.0, the slurry is then filtered, and the resulting cake is heated under a non-oxidizing gas atmosphere to remove the solvent (for example, Japanese Patent Application Laid-Open No. 2002-201275).

However, according to the conventional production processes of the PAS, it has been impossible or extremely difficult to provide a PAS excellent in melt stability and whiteness degree and slow in crystallization speed from a molten state.

DISCLOSURE OF THE INVENTION

It is an object of the present invention to provide a poly (arylene sulfide) slow in crystallization speed from a molten state and excellent in whiteness degree, and a production process thereof.

Another object of the present invention is to provide a poly(arylene sulfide) markedly improved in melt stability in addition to the above-described properties, and a production process thereof.

In particular, a further object of the present invention is to provide a poly(arylene sulfide), which is obtained by subjecting a sulfur source and a dihalo-aromatic compound to a polymerization reaction in the presence of an alkali metal hydroxide in an organic amide solvent, and is low in crystallization temperature, high in whiteness degree and excellent in melt stability, and a production process thereof.

The present inventors have carried out an extensive investigation with a view toward achieving the above objects. As a result, it has been found that in a production process of a PAS by polymerizing a sulfur source and a dihalo-aromatic compound in the presence of an alkali metal hydroxide in an organic amide solvent, first, charged amounts of the respective components are adjusted in such a manner that the alkali metal hydroxide is present in a proportion of 1.00 to 1.09 mol per mol of the sulfur source, and second, the polymer formed in the polymerization step is washed repeatedly at least twice with a washing liquid composed of water, a hydrophilic organic solvent or a mixed liquid thereof in a washing step after the polymerization, and at this time, the polymer is washed with water or the mixed liquid at a final washing stage, and washing conditions are controlled in such a manner that the pH of the washing liquid after the washing falls within a range of 8.0 to 11.0, thereby obtaining a PAS, which is low in crystallization temperature, excellent in whiteness degree and further markedly improved in melt stability.

The present invention has been led to completion on the basis of these findings.

According to the present invention, there is thus provided a poly(arylene sulfide) having the following properties (a) to (d):

(a) melt viscosity being 1 to 3,000 Pa·s as measured under conditions of a temperature of 310° C. and a shear rate of 1,216 sec$^{-1}$;

(b) pH being 7.0 to 12.0 as measured in a mixed solvent of water/acetone (volume ratio=2/1);

(c) crystallization temperature being at most 220° C. as measured in the course of lowing the temperature of the polymer at a rate of 10° C./min from a molten state; and (d) whiteness degree being at least 70 as measured in the form of a melt molded or formed product.

The poly(arylene sulfide) according to the present invention may desirably further have the following properties (e) and/or (f):

(e) a ratio $MV_2/MV_1$ being at least 0.80, wherein $MV_2$ is a melt viscosity value measured at a shear rate of 1,216 sec$^{-1}$ after held for 30 minutes at 310° C. and $MV_1$ is a melt viscosity value measured at a shear rate of 1,216 sec$^{-1}$ after held for 5 minutes at 310° C.; and (f) content of a low-molecular weight component extracted by Soxhlet extraction with chloroform being at most 5.0% by weight.

According to the present invention, there is also provided a process for producing a poly(arylene sulfide) by polymerizing a sulfur source and a dihalo-aromatic compound in an organic amide solvent, which comprises:

(I) in a charging step, controlling charged amounts of the respective components in such a manner that the alkali metal hydroxide is present in a proportion of 1.00 to 1.09 mol per mol of the sulfur source, (II) in a polymerization step, polymerizing the sulfur source and the dihalo-aromatic compound in the presence of the alkali metal hydroxide in the organic amide solvent, (III) in a washing step, washing a polymer formed in the polymerization step repeatedly at least twice with a washing liquid composed of water, a hydrophilic organic solvent or a mixed liquid thereof, and at this time, washing the polymer with water or the mixed liquid at a final washing stage, and controlling washing conditions in such a manner that the pH of the washing liquid after the washing falls within a range of 8.0 to 11.0, and (IV) in a collecting step after the washing step, collecting a polymer having the following properties (a) to (d):

(a) melt viscosity being 1 to 3,000 Pa·s as measured under conditions of a temperature of 310° C. and a shear rate of 1,216 sec$^{-1}$;

(b) pH being 7.0 to 12.0 as measured in a mixed solvent of water/acetone (volume ratio=2/1);

(c) crystallization temperature being at most 220° C. as measured in the course of lowering the temperature of the polymer at a rate of 10° C./min from a molten state at a temperature of 340° C.; and (d) whiteness degree being at least 70 as measured in the form of a melt molded or formed product.

The production process of the poly(arylene sulfide) according to the present invention may desirably comprise the following steps 1 to 5:

(1) a dehydration step 1 of heating and reacting a mixture containing an organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(2) a charging step 2 of adding an alkali metal hydroxide and water to the mixture remaining in the system after the dehydration step, as needed, in such a manner that the alkali metal hydroxide and water are present in proportions of 1.00 to 1.09 mol and 0.5 to 2.0 mol, respectively, per mol of a sulfur source (hereinafter referred to as "charged sulfur source") including the alkali metal hydrosulfide;

(3) a polymerization step 3 including a first-stage polymerization step 3-1 of adding a dihalo-aromatic compound to the mixture to subject the sulfur source and the dihalo-aromatic compound to a polymerization reaction at a temperature of 170 to 270° C., thereby forming a prepolymer that a conversion of the dihalo-aromatic compound is 50 to 98%, and a second-stage polymerization step 3-2 of controlling the amount of water in the reaction system after the first-stage polymerization step so as to bring about a state that water is present in a proportion of 2.0 to 10 mol per mol of the charged sulfur source, and heating the reaction system to 245 to 290° C., thereby continuing the polymerization reaction;

(4) a washing step 4 of washing a polymer formed in the polymerization step after the polymerization step repeatedly at least twice with a washing liquid composed of water, a hydrophilic organic solvent or a mixed liquid thereof, and at this time, washing the polymer with water or the mixed liquid at a final washing stage, and controlling washing conditions in such a manner that the pH of the washing liquid after the washing falls within a range of 8.0 to 11.0; and (5) a collecting step 5 of separating the polymer from the washing liquid after the washing step and drying the polymer.

BEST MODE FOR CARRYING OUT THE INVENTION

1. Sulfur Source

In the present invention, an alkali metal hydrosulfide is generally used as a sulfur source. As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. The alkali metal hydrosulfide may be used in any form of an anhydride, a hydrate and an aqueous solution. Among these, sodium hydrosulfide and lithium hydrosulfide are preferred, in that they are industrially available at a low price. The alkali metal hydrosulfide is preferably used as an aqueous mixture (i.e., a mixture with water having fluidity) such as an aqueous solution from the viewpoints of processing operation, metering, etc.

In general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a charged sulfur source after a dehydration step.

Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred. The alkali metal hydroxide is preferably used as an aqueous mixture such as an aqueous solution.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide.

2. Dihalo-Aromatic Compound

The dihalo-aromatic compound used in the present invention is a dihalogenated aromatic compound having 2 halogen atoms directly bonded to the aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones.

Here, the halogen atom means each of fluorine, chlorine, bromine and iodine atoms, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 0.95 to 1.20 mol, more preferably 1.00 to 1.09 mol per mol of the sulfur source (alkali metal sulfide and/or alkali metal hydrosulfide) remaining in the system after the dehydration step.

3. Molecular Weight Modifier, and Branching or Crosslinking Agent

In order to form a terminal of a specific structure in a PAS formed or modify a polymerization reaction or a molecular weight, a monohalo-compound (may not be always an aromatic compound) may be used in combination. In order to form a branched or crosslinked polymer, a polyhalo-compound (may not be always an aromatic compound), to which at least 3 halogen atoms are bonded, an active hydrogen-containing halogenated aromatic compound, a halogenated aromatic nitro compound or the like may also be used in combination. Preferable examples of the polyhalo-compound as a branching or crosslinking agent include trihalobenzenes.

4. Organic Amide Solvent

In the present invention, an organic amide solvent that is an aprotic polar organic solvent is used as a solvent for the dehydration reaction and polymerization reaction. The organic amide solvent is preferably stable to an alkali at a high temperature.

Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone and N-cyclohexyl-2-pyrrolidone; N,N-dialkyl-imidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkylcaprolactam compounds and N,N-dialkyl-imidazolidinone compounds are preferred, and N-methyl-2-pyrrolidone, N-methyl-ε-caprolactam and 1,3-dialkyl-2-imidazolidinones are particularly preferably used. The amount of the organic amide solvent used in the polymerization reaction in the present invention is generally within a range of 0.1 to 10 kg per mol of the sulfur source.

5. Polymerization Aid

In order to promote the polymerization reaction to obtain a PAS having a high polymerization degree in a short period of time, various kinds of polymerization aids may be used in the present invention as needed. Specific examples of the polymerization aids include metal salts of organic sulfonic acids, lithium halides, metal salts of organic carboxylic acids and alkali metal salts of phosphoric acid, which are generally publicly known as polymerization aids for PASs. Among these, metal salts of organic carboxylic acids are particularly preferred because they are inexpensive. The amount of the polymerization aid used varies according to the kind of the compound used. However, it is generally within a range of 0.01 to 10 mol per mol of the charged sulfur source.

6. Dehydration Step

A dehydration step is arranged as a preliminary step for a polymerization step to control the amount of water in the reaction system. The dehydration step is performed by a process comprising heating a mixture containing the organic amide solvent, the alkali metal hydrosulfide and the alkali metal hydroxide, desirably, under an inert gas atmosphere and discharging water outside the system by distillation.

In the present invention, it is preferred that in the dehydration step, a mixture containing the organic amide solvent, the alkali metal hydrosulfide and the alkali metal hydroxide in a proportion of 0.95 to 1.05 mol per mol of the alkali metal hydrosulfide be heated to cause at least a part of the alkali metal hydrosulfide to react with the alkali metal hydroxide, thereby converting it into an alkali metal sulfide and at the same time, discharge at least a part of a distillate containing water from the interior of the system containing the mixture to the exterior of the system.

If a molar ratio of the alkali metal hydroxide to a mole of the charged alkali metal hydrosulfide in this step is too low, the amount of a sulfur component (hydrogen sulfide) volatilized off in the dehydration step becomes great, which tends to incur reduction in productivity due to lowering of the amount of the charged sulfur source or cause abnormal reactions and deterioration of a PAS formed due to increase of a polysulfide component in the charged sulfur source remaining after the dehydration. If the molar ratio of the alkali metal hydroxide to a mole of the charged alkali metal hydrosulfide is too high, in some cases, change in properties of the organic amide solvent may be increased, difficulty may be encountered on stably performing the polymerization reaction, or the quality of a PAS formed may be deteriorated. A preferable molar ratio of the alkali metal hydroxide to a mole of the charged alkali metal hydrosulfide in this step is 0.96 to 1.04.

In many cases, a small amount of an alkali metal sulfide is contained in an alkali metal hydrosulfide, so that the amount of the sulfur source involves a total of the alkali metal hydrosulfide and the alkali metal sulfide. No problem arises as to a raw material for the PAS even if the alkali metal hydrosulfide contains the alkali metal sulfide. Even when a small amount of the alkali metal sulfide is mixed in, the molar ratio to the alkali metal hydroxide may be calculated out on the basis of the content (analytical value) of the alkali metal hydrosulfide to regulate the molar ratio.

In the dehydration step, the dehydration is conducted until the content of water comprising water of hydration (water of crystallization), a water medium, secondarily produced water, etc. is lowered within a range of necessary amounts. In the dehydration step, the dehydration is preferably conducted until the water content in the polymerization reaction system is reduced to 0.5 to 2.0 mol per mol of the sulfur source. When the water content has become too low in the dehydration step, water may be added prior to the polymerization step to regulate the water content to a desired value.

The charging of these raw materials into a reaction vessel is conducted within a temperature range of generally from ordinary temperature to 300° C., preferably from ordinary temperature to 200° C. The charging of the raw materials may not be in order, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred. The amount of the organic amide solvent used is generally of the order of 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system of both systems.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

In the dehydration step, it is considered that the alkali metal hydroxide reacts with the organic amide solvent by the heat treatment to produce an alkali metal alkylaminoalkylcarboxylate, and the alkali metal hydrosulfide exists in the system in the form of a complex with the alkali metal alkylaminoalkylcarboxylate. On the other hand, a part of the alkali metal hydrosulfide reacts with water to produce hydrogen sulfide and an alkali metal hydroxide, and the hydrogen sulfide produced is discharged outside the system. The discharge of hydrogen sulfide outside the system is directly linked with the weight loss of the sulfur source in the system. Accordingly, it is important to measure the amount of hydrogen sulfide volatilized off in the dehydration step to exactly calculate out the amount of the sulfur source remaining in the system in that a molar ratio of the sulfur source to the alkali metal hydroxide or dihalo-aromatic compound is regulated.

7. Charging Step

In the present invention, it is preferred that an alkali metal hydroxide and water be added to the mixture remaining in the system after the dehydration step, as needed, in such a manner that the alkali metal hydroxide and water are present in proportions of 1.00 to 1.09 mol and 0.5 to 2.0 mol, respectively, per mol of the sulfur source (charged sulfur source) including the alkali metal hydrosulfide and alkali metal sulfide. Here, the amount of the charged sulfur source is calculated out in accordance with an equation, [Charged sulfur source]=[Total moles of sulfur charged]−[Moles of sulfur volatilized off after dehydration]. The amount of the charged sulfur source may also be referred to as the amount of "available S".

When hydrogen sulfide is volatilized off in the dehydration step, an alkali metal hydroxide is produced by an equilibrium reaction and comes to remain in the system. Accordingly, it is necessary to exactly grasp these amounts to determine a molar ratio of the alkali metal hydroxide to the sulfur source in the charging step.

If the molar ratio of the alkali metal hydroxide to a mole of the sulfur source is too high, in some cases, change in properties of the organic amide solvent may be increased, or abnormal reactions or decomposition reactions may be caused upon polymerization. In addition, the lowering of the yield and quality of a PAS formed is often caused. The molar ratio of the alkali metal hydroxide to a mole of the sulfur source is 1.00 to 1.09 mol, preferably 1.01 to 1.08 mol, more preferably 1.015 to, 1.075, particularly preferably 1.02 to 1.06. It is preferred to conduct the polymerization reaction slightly in excess of the alkali metal hydroxide in that the polymerization reaction is stably performed to obtain a high-quality PAS.

8. Polymerization Step

The polymerization step is conducted by charging a dihalo-aromatic compound into the mixture after completion of the dehydration step and heating the sulfur source and the dihalo-aromatic compound in the organic amide solvent. When a different polymerization vessel from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water, and the like may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally from 100 to 350° C., preferably from 120 to 330° C. When the respective components are charged into the polymerization vessel, no particular limitation is imposed on the order of charging. In general, both components are partially charged in small portions or at a time.

In general, the polymerization reaction is preferably conducted by a two-stage process at a temperature ranging from 170 to 290° C. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The amount of the organic amide solvent used in the polymerization step is within a range of generally from 0.1 to 10 kg, preferably from 0.15 to 1 kg per mol of the charged sulfur source existing in the polymerization step. The amount may be changed in the course of the polymerization reaction so far as it falls within this range.

The amount of water coexisting upon the beginning of the polymerization reaction is preferably controlled within a range of 0.5 to 2.0 mol per mol of the charged sulfur source. It is preferable to increase the amount of the coexisting water in the course of the polymerization reaction.

In a preferable production process according to the present invention, the polymerization reaction is conducted in the polymerization step by an at least two-stage polymerization process comprising:

(A) a first-stage polymerization step of heating a reaction mixture containing the organic amide solvent, the sulfur source, the dihalo-aromatic compound and the alkali metal hydroxide of the specified molar ratio to 170 to 270° C. in the presence of water in a proportion of 0.5 to 2.0 mol per mol of the charged sulfur source to conduct a polymerization reaction, thereby forming a prepolymer that a conversion of the dihalo-aromatic compound is 50 to 98%; and (B) a second-stage polymerization step of controlling the amount of water in the reaction system so as to bring about a state that water is present in a proportion of 2.0 to 10 mol per mol of the charged sulfur source, and heating the reaction system to 245 to 290° C., thereby continuing the polymerization reaction.

In the first-stage polymerization step, it is desirable to form a prepolymer having a melt viscosity of 0.5 to 30 Pa·s as measured at a temperature of 310° C. and a shear rate of 1,216 $sec^{-1}$.

Water may be added at a final stage of the polymerization reaction or upon completion thereof to increase the water content for the purpose of lowering the contents of common salt secondarily produced and impurities in the polymer formed or collecting the polymer in the form of particles. The system of the polymerization reaction may be a batch system, a continuous system or a combination of both systems. In the batch-wise polymerization, 2 or more reaction vessels may be used for the purpose of shortening the polymerization cycle time.

9. Post Treatment Step

As a post treatment step after the polymerization reaction, there is a step of separating a PAS formed by the polymerization reaction from a reaction mixture (slurry) containing the PAS and washing and drying the PAS. After the drying, the PAS is collected as a product.

More specifically, after completion of the polymerization reaction, for example, a slurry cooled is separated by filtration as it is or after diluted with water or the like, and the resultant filter cake is washed and filtered repeatedly and then dried, whereby the PAS can be collected. According to the preferable production process of the present invention, a granular polymer can be formed, so that the granular polymer is preferably separated from the slurry by a method of sifting the polymer by means of a screen because the polymer can be easily separated from the organic amide solvent, by-products, oligomers, etc. The slurry after the polymerization reaction may be subjected to sifting as it is in a high-temperature state, thereby collecting the polymer.

In general, the organic amide solvent, an alkali metal halide, oligomers, decomposition products, etc. adhere to the PAS after such separating treatment. Accordingly, it is necessary to fully wash and purify the PAS formed in order to obtain a PAS having excellent physical properties.

In the present invention, in the washing step, the polymer formed in the polymerization step is washed repeatedly at least twice with a washing liquid composed of water, a hydrophilic organic solvent or a mixed liquid thereof. In the present invention, the washing is desirably conducted preferably at least 3 times, more preferably at least 4 times, particularly preferably at least 5 times. The upper limit of the washing times is of the order of 10 to 15 times in many cases.

The hydrophilic organic solvent may be either an aprotic organic solvent or a protic organic solvent. Examples of the aprotic organic solvent include ketone solvents such as acetone; nitrile solvents such as acetonitrile; and amide solvents such as N-methyl-2-pyrrolidone and N,N-dimethylformamide. Examples of the protic organic solvent include alcohol solvents such as methyl alcohol, ethyl alcohol, propyl alcohol and ethylene glycol. These hydrophilic organic solvents may be used either singly or in any combination thereof. Among these hydrophilic organic solvents, acetone is preferred in that it is excellent in the effect to remove impurities (low-molecular weight components) such as oligomer and decomposition products. Acetone is also preferred from the viewpoints of economics and safety.

The hydrophilic organic solvents are excellent in the effect to remove low-molecular weight organic impurities such as oligomers and decomposition products. A mixed liquid of water and a hydrophilic organic solvent is excellent in the effect to remove a secondarily produced alkali metal halide such as NaCl in addition to the low-molecular weight organic impurities. Water is excellent in the effect to remove the alkali metal halide, the organic amide solvent and the hydrophilic organic solvent used in the washing.

Therefore, in the washing step, it is preferable to perform washing with the hydrophilic organic solvent or the mixed liquid (mixture of water and the hydrophilic organic solvent) and washing with water in combination. It is preferable that the washing with the hydrophilic organic solvent or mixed liquid be performed at an initial stage of the washing step, and washing with water be then conducted. A mixing ratio of water to the hydrophilic organic solvent in the mixed liquid is optional and may be suitably selected from any mixing ratios within a range of from 1:99 to 99:1 in terms of a weight ratio. When the washing with the mixed liquid and washing with water are performed in combination without conducting the washing with the hydrophilic organic solvent, however, a mixed liquid containing water in a proportion of preferably 1 to 60% by weight, more preferably 1 to 30% by weight, particularly preferably 1 to 20% by weight is preferably used as the mixed liquid in that the removal efficiency of the organic impurities such as oligomers and decomposition products is raised.

The washing with the washing liquid is generally performed by mixing the PAS with the washing liquid and stirring the resultant mixture. The amount of the washing liquid used in each washing is generally 1 to 15 times, preferably 2 to 10 times, more preferably 3 to 8 times as much as the volumetric amount of the polymer. The washing is conducted for generally 1 to 120 minutes, preferably 3 to 100 minutes, more preferably 5 to 60 minutes.

After the washing, the washing liquid is separated by means of a screen, centrifugal separator or the like. Filtration is conducted by means of the screen, a wet cake having a liquid content of generally 30 to 70% by weight, often 40 to 60% by weight is obtained. The centrifugal separator may be used to obtain a wet cake low in liquid content.

After the washing with such a washing liquid and the filtration, the next washing is conducted. The washing is generally conducted at ordinary temperature (15 to 30° C.). However, the washing may also be conducted at a temperature lower or higher than that temperature so far as the washing liquid is in a liquid state. For example, it may be preferable in some cases to use hot water as the washing liquid for the purpose of enhancing the detergency of water. In the washing step, the PAS formed may also be subjected to a treatment (washing) with an acid or a treatment with a salt such as ammonium chloride.

In the production process according to the present invention, at a final washing stage (i.e., washing of the last run) of such repeated washing, the PAS was washed with a washing liquid composed of water or the mixed liquid (i.e., a mixed liquid of water and the hydrophilic organic solvent), and washing conditions are controlled in such a manner that the pH of the washing liquid after the washing falls within a range of 8.0 to 11.0. In this final washing stage, water or a mixed liquid (for example, a mixed liquid containing water in an amount of 60 to 99% by weight) containing water in a high proportion is preferably used. Water is more preferably used.

The final washing stage means washing of the last run in the repeated washing, and after the washing of the last run, the PAS is dried and collected as a product. The pH of the washing liquid after the washing means a pH of the washing liquid as measured after the PAS is mixed with the washing liquid, and the resultant mixture is stirred to conduct the washing. In the PAS obtained by polymerizing the sulfur source with the dihalo-aromatic compound in the presence of the alkali metal hydroxide in the organic amide solvent, alkaline compounds such as a remaining alkali metal hydroxide are dissolved out in the washing liquid, so that the washing liquid after the washing may show an alkaline pH even when water is used as the washing liquid.

Examples of a method for controlling the washing conditions at the final washing stage in such a manner that the pH of the washing liquid after the washing falls within a range of 8.0 to 11.0 include (i) a method of using a washing liquid to which an acid or basic compound is added, (ii) a method of controlling the number of washing runs, (iii) a method of controlling the amount of the washing liquid to the polymer, and (iv) a method of combining these methods.

The washing conditions are controlled at the final washing stage in such a manner that the pH of the washing liquid after the washing falls within a range of 8.0 to 11.0, thereby collecting a PAS having a pH (hereinafter may be referred to as "resin pH") of 7.0 to 12.0 as measured in a mixed solvent of water/acetone (volume ratio=2:1). A method for measuring this resin pH will be described in detail in EXAMPLES.

The resin pH of the PAS is controlled within a range of 7.0 to 12.0 in the washing step, whereby a PAS low in crystallization temperature, high in whiteness degree and excellent in melt stability can be obtained. If the pH of the washing liquid after the washing at the final washing stage is too high, the resin pH also becomes high, and the whiteness degree and melt stability are also lowered. If the pH of the washing liquid after the washing at the final washing stage is too low, the resin pH also becomes low, and only a PAS high in crystallization temperature, low in whiteness degree and insufficient in melt stability is obtained. The pH of the washing liquid after the washing at the final washing stage is generally 8.0 to 11.0, preferably 8.5 to 10.7.

In the washing step, the washing is desirably repeated until the content of a low-molecular weight component extracted by Soxhlet extraction with chloroform is preferably at most 5.0% by weight, more preferably at most 4.0% by weight, particularly preferably at most 3.0% by weight. If the washing is insufficient, the content of the low-molecular weight component is increased, so that the physical properties of the PAS are deteriorated, and its uses are limited.

After the washing, the PAS is separated from the washing liquid by filtration using a screen, or the like. The PAS (wet cake) in a wetted state, which has been separated from the washing liquid, is heated and dried under ordinary pressure or reduced pressure to remove the washing liquid. In such a manner, a dried PAS is collected.

10. Poly(Arylene Sulfide) (PAS)

The PAS according to the present invention is an aromatic polymer having predominant repeating units of arylene sulfide represented by the structural formula [—Ar—S—] in which Ar is an arylene group. When the repeating unit [—Ar—S—] is defined as 1 mole (basal mole), the PAS according to the present invention is a polymer containing this repeating unit in a proportion of generally at least 50 mol %, preferably at least 70 mol %, more preferably at least 90 mol %. The arylene group (Ar) is preferably a p-phenylene group or a m-phenylene group.

According to the production process of the present invention, there can be provided a PAS having the following various properties as measured in accordance with respective measuring methods (described in EXAMPLES) prescribed in the present description.

The PAS according to the present invention has a melt viscosity of 1 to 3,000 Pa·s, preferably 3 to 2,000 Pa·s, more preferably 10 to 1,500 Pa·s, particularly preferably 15 to 1,200 Pa·s as measured under conditions of a temperature of 310° C. and a shear rate of 1,216 sec$^{-1}$. The melt viscosity of the PAS is used as an index to its molecular weight. If the melt viscosity of the PAS is too low, its mechanical properties become insufficient. If the melt viscosity is too high, its melt-flow characteristics are deteriorated to lower the molding or forming and processing ability thereof.

The PAS according to the present invention has a pH (resin pH) of 7.0 to 12.0, preferably 7.0 to 11.5, more preferably 7.5 to 11.5 as measured in a mixed solvent of water/acetone (volume ratio=2:1). The production conditions including the washing conditions for the PAS according to the present invention are controlled in such a manner that the resin pH thereof falls within this range, whereby the whiteness degree, crystallization temperature and melt stability can be adjusted to respective preferable ranges.

The PAS according to the present invention has a crystallization temperature (also referred to as "melt crystallization temperature") of at most 220° C., preferably at most 210° C. as measured in the course of lowering the temperature of the PAS at a rate of 10° C./min from a molten state at a temperature of 340° C. In many cases, the crystallization temperature can be lowered to at most 205° C., further at most 200° C. The lower limit of the crystallization temperature is preferably about 165° C. Since the PAS according to the present invention has a low crystallization temperature, its crystallization speed from a molten state is slow. The crystallization speed of the PAS is made slow, whereby melt formability such as extrudability can be improved.

The PAS according to the present invention has a whiteness degree of at least 70 as measured in the form of a melt molded or formed product. The upper limit of the whiteness degree is generally of the order of 85 or 80. When the whiteness degree of the PAS is high, a molded or formed product excellent in color tone can be obtained, and moreover a molded or formed product of the PAS can be easily toned to any given color. If the whiteness degree of the PAS is too low, the color tone of the resulting molded or formed product becomes brown, or color irregularity occurs. If the whiteness degree of the PAS is too low, it is also difficult to color the molded or formed product to a desired color with a colorant.

In the PAS according to the present invention, a ratio $MV_2/MV_1$ is preferably at least 0.80, more preferably at least 0.85, wherein $MV_2$ is a melt viscosity value measured at a shear rate of 1,216 sec$^{-1}$ after held for 30 minutes at 310° C. and $MV_1$ is a melt viscosity value measured at a shear rate of 1,216 sec$^{-1}$ after held for 5 minutes at 310° C. In many cases, this ratio $MV_2/MV_1$ can be controlled to at least 0.90, further at least 0.95.

The upper limit of this $MV_2/MV_1$ is preferably 1.0.

A higher ratio $MV_2/MV_1$ (closer to 1.0) indicates that the melt stability of the PAS is better. If the melt stability of the PAS is poor, it is often difficult to stably conduct melt molding or forming because the melt viscosity varies even with slight change in molding or forming conditions. For example, if the melt stability of the PAS is poor, thread breakage is easy to occur upon melt spinning. In addition, if the melt stability of the PAS is poor, changes in physical properties of a molded or formed product obtained by melt processing may be caused. Since the PAS according to the present invention is excellent in melt stability, such defects are overcome.

In the PAS according to the present invention, a content of a low-molecular weight component extracted by Soxhlet extraction with chloroform is preferably at most 5.0% by weight, more preferably at most 4.0% by weight, particularly preferably at most 3.0% by weight. The content of the low-molecular weight component contained in the PAS is preferably as low as possible. The lower limit thereof is generally of the order of 1.0% by weight or 1.5% by weight. If the content of the low-molecular weight component is too high, the melt stability of the PAS is deteriorated, and the physical properties of the resulting molded or formed product are lowered.

Since the PAS according to the present invention is excellent in melt stability, low in crystallization temperature and excellent in whiteness degree, it is suitable for use as a material of fibers and the like. The PAS according to the present invention can be formed or molded into various formed or molded products by extrusion, injection molding, compression molding or the like. Among PAS, PPS is particularly preferred.

Effects of the Invention

Since the PAS according to the present invention is excellent in melt formability such as extrudability due to its slow crystallization speed from a molten state, and also excellent in melt stability, for example, thread breakage is hard to occur upon melt spinning, and changes in physical properties are hard to occur on formed or molded products after melt forming or molding. Further, the PAS according to the present invention can provide formed or molded products high in whiteness degree because its thermal color change upon melt processing is little.

EXAMPLES

The present invention will hereinafter be described more specifically by the following Examples and Comparative Examples. Measuring methods of yield, physical properties and properties or characteristics are as follows.
(1) Yield:
 Assuming that all the available sulfur component existing in a reaction vessel after a dehydration step was converted to a polymer, the weight (theoretical amount) of that polymer was used as a reference value to calculate out a proportion (% by weight) of the weight of a polymer actually collected to the reference value as a yield of the polymer.
(2) Melt Viscosity:
 A melt viscosity was measured by using about 20 g of a dry polymer by means of Capirograph 1-C (manufactured by Toyo Seiki Seisaku-sho, Ltd.). At this time, a flat die of 1 mm in diameter×10 mm in length was used as a capillary, and the temperature was set to 310° C. After the polymer sample was placed in the apparatus and held for 5 minutes, the melt viscosity was measured at a shear rate of 1,216 sec$^{-1}$.
(3) Melt Stability:
 Melt viscosities of a polymer sample were measured in accordance with the above-described measuring method of the melt viscosity except that the heating time of the polymer at the temperature of 310° C. was set to 5 minutes and 30 minutes, and a ratio between the measured values was calculated out. More specifically, a melt viscosity ($MV_1$) of the polymer sample was measured at a shear rate of 1,216 sec$^{-1}$ after held for 5 minutes at a temperature of 310° C. A melt viscosity ($MV_2$) of the same polymer sample was measured at a shear rate of 1,216 sec$^{-1}$ after held for 30 minutes at 310° C. A ratio ($MV_2/MV_1$) was then calculated out on the basis of these measured values. This ratio is also referred to as retention of melt viscosity, and a greater value indicates the melt stability of the polymer is higher.
(4) Determination (Soxhlet Extraction) of a Low-Molecular Weight Component:
 About 10 g of a polymer was subjected to Soxhlet extraction with 50 ml of chloroform as an extracting solvent. Extraction time was set to 6 hours. After completion of the extraction, the solvent was evaporated by a rotary evaporator, and the residue was vacuum-dried at 60° C. for 2 hours. The weight of the extract remaining in a flask was then measured to calculate out a content of a low-molecular weight component contained in the polymer on the basis of the measured weight and the weight of the polymer used in the extraction.
(5) Whiteness Degree (WH):
 A polymer was heated and melted at 320° C. for 10 minutes by a hot press and then solidified by pressing at room temperature to produce a sheet. The resultant sheet was annealed at 150° C. for 30 minutes to produce a crystallized sheet. This crystallized sheet was used as a sample for measurement to measure a color tone by means of "Color and Color Difference Meter CR-200" manufactured by MINOLTA in accordance with a reflected light measuring method under conditions of standard light C. Prior to the measurement, the apparatus was calibrated by a standard white plate. The measurement was conducted at 3 points as to each sample, and an average value thereof was calculated out. The color tone of the sample was indicated by a whiteness degree (WH).
(6) Crystallization Temperature (Tmc):
 A polymer was heated and melted at 320° C. for 10 minutes by a hot press and then quenched to produce an amorphous sheet. About 10 mg of a sample for measurement was collected from this amorphous sheet to measure its crystallization temperature (Tmc) under temperature-lowering conditions by means of "Differential Scanning Calorimeter DSC7" manufactured by Perkin Elmer. More specifically, the crystallization temperature was measured under conditions that the sample was heated to 340° C. in a nitrogen gas atmosphere (20 ml/min), held for 1 minute at that temperature and then cooled at a rate of 10° C./min.
(7) Resin pH:
 About 6 g of a polymer sample, 15 ml of acetone and 30 ml of purified water (product of Kanto Chemical Co., Inc.) were placed into an Erlenmeyer flask, shaken for 30 minutes by means of a shaker and then filtered by a separating funnel. A pH of the resultant liquid was measured by means of a pH meter.

Example 1

1. Dehydration Step

A 20-liter autoclave (reactor) made of titanium was charged with 1,951 g of an aqueous sodium hydrosulfide (NaSH) solution [sulfur (S) content: 22.08 mol; analytical value of NaSH by a neutralization titration method: 61.86% by weight (21.53 mol); sodium sulfide ($Na_2S$) content: 0.55 mol] having an analytical value of 63.44% by weight as measured by iodimetry and 1,151 g of a 74.78% by weight aqueous sodium hydroxide (NaOH) solution (NaOH content: 21.52 mol) together with 6,701 g of N-methyl-2-pyrrolidone (hereinafter abbreviated as "NMP"). When a sulfur source composed of sodium hydrosulfide and sodium sulfide is indicated as "S", NaOH/NaSH before dehydration is 1.00 (mol/mol), and NaOH/S is 0.97 (mol/mol).

After purged with nitrogen gas, the contents were gradually heated to 200° C. over 2.5 hours with stirring to distill off 893.2 g of water and 852.8 g of NMP. At this time, 0.4 mol of hydrogen sulfide ($H_2S$) was volatilized off. Accordingly, the amount of the sulfur source ("available S") in the reactor after the dehydration step was 21.68 mol. The amount of $H_2S$ volatilized off corresponded to 1.79 mol % based on the charged S in this step.

2. Charging Step

After the dehydration step, the reactor containing 21.68 mol of the available S was cooled to 170° C., 3,267 g [p-dichlorobenzene (hereinafter abbreviated as "pDCB")/available S=1.025 (mol/mol)] of pDCB, 2,284 g of NMP and 114 g [total water content in the reactor/available S=1.50 (mol/mol)] of water were added, and 16.12 g of NaOH having a purity of 97% was added in such a manner that (NaOH in the reactor/available S) is 1.054 (mol/mol). NaOH (0.78 mol) produced by volatilization of $H_2S$ is contained in the reactor.

3. Polymerization Step

While stirring the contents at 250 rpm by a stirrer installed in the reactor, a reaction was conducted at 220° C. for 1 hour, and the reaction mixture was then heated to 230° C. in 30 minutes to conduct the reaction at 230° C. for 1.5 hours (first-stage polymerization step; conversion of pDCB=about 92%). Thereafter, the number of revolutions of the stirrer was increased to 400 rpm, 441.5 g of water was charged under pressure into the reactor [total water content in the reactor/available S=2.63 (mol/mol)] while continuing the stirring, and the contents were heated to 255° C. to conduct a reaction for 4.0 hours (second-stage polymerization step).

4. Post Treatment Step

After completion of the reaction, 2,154.3 g of the reaction mixture cooled near to room temperature was sampled and sifted through a 100-mesh screen to collect a granular polymer in a wetted state (water content: 60% by weight). To the granular polymer in the wetted state, were added 1,528 g of acetone and 80 g of ion-exchanged water to wash the polymer with stirring. At this time, the amount of the washing liquid is 5 times as much as the theoretical amount of the polymer collected, and the water content in the washing liquid is 5% by weight.

After the above-described washing was performed twice, washing under stirring with 1,608 g of ion-exchanged water was conducted 5 times. This washing with ion-exchanged water was conducted for 20 minutes in each run. After completion of final washing with ion-exchanged water, a pH meter was placed into the washing liquid before filtration to measure a pH after 5 minutes. As a result, it was 10.7.

In each washing described above, the temperature of the washing liquid was set to room temperature to conduct the washing. Stirring power was set to at least limitation of suspension.

Sifting of the polymer component after the washing was conducted by filtration using a 100-mesh screen. A liquid content in a wet cake after the filtration was 40 to 60% by weight.

The washed polymer obtained in this manner was dried at 105° C. for 13 hours by a dryer. The yield of the granular polymer thus obtained was 92%, and the melt viscosity thereof was 160 Pa·s. The data of color tone, melt stability, crystallization temperature and content of a low-molecular weight component were shown in Table 1.

Example 2

1. Dehydration Step

A 20-liter autoclave (reactor) made of titanium was charged with 1,950 g of an aqueous sodium hydrosulfide (NaSH) solution [sulfur (S) content: 22.07 mol; analytical value of NaSH by a neutralization titration method: 61.86% by weight (21.52 mol); sodium sulfide ($Na_2S$) content: 0.55 mol] having an analytical value of 63.44% by weight as measured by iodimetry and 1,119 g of a 74.78% by weight aqueous sodium hydroxide (NaOH) solution (NaOH content: 20.92 mol) together with 6,700 g of NMP. NaOH/NaSH before dehydration is 0.97 (mol/mol), and NaOH/S is 0.95 (mol/mol).

After purged with nitrogen gas, the contents were gradually heated to 200° C. over 2.5 hours with stirring to distill off 889.3 g of water and 833.0 g of NMP. At this time, 0.4 mol of hydrogen sulfide ($H_2S$) was volatilized off. Accordingly, the amount of the available S in the reactor after the dehydration step was 21.67 mol. The amount of $H_2S$ volatilized off corresponded to 1.81 mol % based on the charged S in this step.

2. Charging Step

After the dehydration step, the reactor containing 21.67 mol of the available S was cooled to 170° C., 3,265 g [pDCB/available S=1.025 (mol/mol)] of pDCB, 2,260 g of NMP and 118 g [total water content in the reactor/available S=1.50 (mol/mol)] of water were added, and 9.53 g of NaOH having a purity of 97% was added in such a manner that (NaOH in the reactor/available S) is 1.020 (mol/mol). NaOH (0.80 mol) produced by volatilization of $H_2S$ is contained in the reactor.

3. Polymerization Step

While stirring the contents at 250 rpm by a stirrer installed in the reactor, a reaction was conducted at 220° C. for 1 hour, and the reaction mixture was then heated to 230° C. in 30 minutes to conduct the reaction at 230° C. for 1.5 hours (first-stage polymerization step; conversion of pDCB=about 92%). Thereafter, the number of revolutions of the stirrer was increased to 400 rpm, 441.2 g of water was charged under pressure into the reactor [total water content in the reactor/available S=2.63 (mol/mol)] while continuing the stirring, and the contents were heated to 255° C. to conduct a reaction for 4.0 hours (second-stage polymerization step).

4. Post Treatment Step

After completion of the reaction, the resultant polymer was washed in the same manner as in Example 1 to obtain a purified polymer. After completion of final washing with ion-exchanged water, a pH meter was placed into the washing liquid before filtration to measure a pH after 5 minutes. As a result, it was 9.9. The yield of the granular polymer thus obtained was 93%, and the melt viscosity thereof was 141 Pa·s. The data of color tone, melt stability, crystallization temperature and content of a low-molecular weight component were shown in Table 1.

Example 3

The dehydration step to the polymerization step were performed in exactly the same manner as in Example 1. A post treatment step was conducted in accordance with the following process.

4. Post Treatment Step

After completion of the reaction, washing of the polymer was performed in the same manner as in Example 1 except that the washing with ion-exchanged water was conducted 7 times, thereby obtaining a purified polymer. After completion of final washing with ion-exchanged water, a pH meter was placed into the washing liquid before filtration to measure a pH after 5 minutes. As a result, it was 9.7. The yield of the granular polymer thus obtained was 92%, and the melt viscosity thereof was 145 Pa·s. The data of color tone, melt stability, crystallization temperature and content of a low-molecular weight component were shown in Table 1.

Example 4

1. Dehydration Step

A 20-liter autoclave (reactor) made of titanium was charged with 1,802 g of an aqueous sodium hydrosulfide (NaSH) solution [sulfur (S) content: 20.06 mol; analytical value of NaSH by a neutralization titration method: 59.42% by weight (19.11 mol); sodium sulfide ($Na_2S$) content: 0.95 mol] having an analytical value of 62.39% by weight as measured by iodimetry and 1,045 g of a 74.08% by weight aqueous sodium hydroxide (NaOH) solution (NaOH content: 19.35 mol) together with 6,702 g of NMP. NaOH/NaSH before dehydration is 1.01 (mol/mol), and NaOH/S is 0.96 (mol/mol).

After purged with nitrogen gas, the contents were gradually heated to 200° C. over 2.5 hours with stirring to distill off 824.3 g of water and 829.7 g of NMP. At this time, 0.38 mol of hydrogen sulfide ($H_2S$) was volatilized off. Accordingly, the amount of the available S in the reactor after the dehydration step was 19.68 mol. The amount of $H_2S$ volatilized off corresponded to 1.91 mol % based on the charged S in this step.

2. Charging Step

After the dehydration step, the reactor containing 19.68 mol of the available S was cooled to 170° C., 2,951 g [pDCB/available S=1.020 (mol/mol)] of pDCB, 2,000 g of NMP and 97 g [total water content in the reactor/available S=1.50 (mol/mol)] of water were added, and 2.72 g of NaOH having a purity of 97% was added in such a manner that (NaOH in the reactor/available S) is 1.054 (mol/mol). NaOH (0.76 mol) produced by volatilization of $H_2S$ is contained in the reactor.

3. Polymerization Step

While stirring the contents at 250 rpm by a stirrer installed in the reactor, a reaction was conducted at 220° C. for 1 hour (first-stage polymerization step; conversion of pDCB=about 92%). Thereafter, the number of revolutions of the stirrer was increased to 400 rpm, 461.0 g of water was charged under pressure into the reactor [total water content in the reactor/available S=2.82 (mol/mol)] while continuing the stirring, and the contents were heated to 260° C. to conduct a reaction for 5.0 hours (second-stage polymerization step).

4. Post Treatment Step

After completion of the reaction, the resultant polymer was washed in the same manner as in Example 1 to obtain a purified polymer. After completion of final washing with ion-exchanged water, a pH meter was placed into the washing liquid before filtration to measure a pH after 5 minutes. As a result, it was 10.0. The yield of the granular polymer thus obtained was 92%, and the melt viscosity thereof was 230 Pa·s. The data of color tone, melt stability, crystallization temperature and content of a low-molecular weight component were shown in Table 1.

Example 5

1. Dehydration Step

A 20-liter autoclave (reactor) made of titanium was charged with 1,804 g of an aqueous sodium hydrosulfide (NaSH) solution [sulfur (S) content: 19.99 mol; analytical value of NaSH by a neutralization titration method: 59.5% by weight (19.15 mol); sodium sulfide ($Na_2S$) content: 0.84 mol] having an analytical value of 62.12% by weight as measured by iodimetry and 1,030.6 g of a 73.95% by weight aqueous sodium hydroxide (NaOH) solution (NaOH content: 19.05 mol) together with 6,005 g of NMP. NaOH/NaSH before dehydration is 0.99 (mol/mol), and NaOH/S is 0.95 (mol/mol).

After purged with nitrogen gas, the contents were gradually heated to 200° C. over 2.5 hours with stirring to distill off 840.3 g of water and 787.2 g of NMP. At this time, 0.4 mol of hydrogen sulfide ($H_2S$) was volatilized off. Accordingly, the amount of the available S in the reactor after the dehydration step was 19.59 mol. The amount of $H_2S$ volatilized off corresponded to 2.01 mol % based on the charged S in this step.

2. Charging Step

After the dehydration step, the reactor containing 19.59 mol of the available S was cooled to 170° C., 2,923 g [pDCB/available S=1.015 (mol/mol)] of pDCB, 3,597.6 g of NMP and 176 g [total water content in the reactor/available S=1.70 (mol/mol)] of water were added, and 13.9 g of NaOH having a purity of 97% was added in such a manner that (NaOH in the reactor/available S) is 1.054 (mol/mol). NaOH (0.80 mol) produced by volatilization of $H_2S$ is contained in the reactor.

3. Polymerization Step

While stirring the contents at 250 rpm by a stirrer installed in the reactor, a reaction was conducted at 220° C. for 4.5 hours (first-stage polymerization step; conversion of pDCB=about 93%). Thereafter, the number of revolutions of the stirrer was increased to 400 rpm, 607 g of water was charged under pressure into the reactor [total water content in the reactor/available S=3.45 (mol/mol)] while continuing the stirring, and the contents were heated to 255° C. to conduct a reaction for 2.0 hours, and then cooled to 245° C. over 30 minutes to conduct a reaction for 11.5 hours (second-stage polymerization step).

4. Post Treatment Step

After completion of the reaction, the resultant polymer was washed in the same manner as in Example 1 to obtain a purified polymer. After completion of final washing with ion-exchanged water, a pH meter was placed into the washing liquid before filtration to measure a pH after 5 minutes. As a result, it was 9.5. The yield of the granular polymer thus obtained was 85%, and the melt viscosity thereof was 450 Pa·s. The data of color tone, melt stability, crystallization temperature and content of a low-molecular weight component were shown in Table 1.

Example 6

The dehydration step to the polymerization step were performed in exactly the same manner as in Example 2. However, a post treatment step was conducted in accordance with the following process.

4. Post Treatment Step

After completion of the reaction, washing of the polymer was performed in the same manner as in Example 1 except that the washing with ion-exchanged water was conducted 8 times, thereby obtaining a purified polymer. After completion of final washing with ion-exchanged water, a pH meter was placed into the washing liquid before filtration to measure a pH after 5 minutes. As a result, it was 8.9. The yield of the granular polymer thus obtained was 92%), and the melt viscosity thereof was 123 Pa·s. The data of color tone, melt stability, crystallization temperature and content of a low-molecular weight component were shown in Table 1.

Comparative Example 1

The dehydration step to the polymerization step were performed in exactly the same manner as in Example 1. However, a post treatment step was conducted in accordance with the following process.

4. Post Treatment Step

Washing of the polymer was performed in the same manner as in Example 1 except that about 3 g of NaOH (purity: 97%) was added to the washing liquid upon final washing with ion-exchanged water, thereby obtaining a purified polymer. After completion of the final washing with ion-exchanged water, a pH meter was placed into the washing liquid before filtration to measure a pH after 5 minutes. As a result, it was 12.5. The yield of the granular polymer thus obtained was 92%, and the melt viscosity thereof was 155 Pa·s. The data of color tone, melt stability, crystallization temperature and content of a low-molecular weight component were shown in Table 1.

Comparative Example 2

The dehydration step to the polymerization step were performed in exactly the same manner as in Example 1. However, a post treatment step was conducted in accordance with the following process.

4. Post Treatment Step

After completion of the reaction, 707 g of the reaction mixture cooled near to room temperature was sampled and sifted through a 100-mesh screen to collect a granular polymer in a wetted state (water content: 60% by weight). To the granular polymer in the wetted state, were added 502 g of acetone and 26 g of ion-exchanged water to wash the polymer with stirring. At this time, the amount of the washing liquid is 5 times as much as the theoretical amount of the polymer collected, and the water content in the washing liquid is 5% by weight. After the above-described washing was performed twice, washing under stirring for 20 minutes with 528 g of ion-exchanged water was conducted 3 times.

Thereafter, this washed polymer was washed under stirring for 30 minutes with a 0.3% aqueous acetic acid solution prepared by adding 1.88 g of acetic acid to 470 g of ion-exchanged water, and washing for 20 minutes with 470 g of ion-exchanged water was conducted additionally 4 times to obtain a washed polymer. After completion of final washing with ion-exchanged water, a pH meter was placed into the washing liquid before filtration to measure a pH after 5 minutes. As a result, it was 3.8.

In each washing described above, the temperature of the washing liquid was set to room temperature to conduct the washing. Stirring power was set to at least limitation of suspension. Sifting of the polymer component after the washing was conducted by filtration using a 100-mesh screen. A liquid content in a wet cake after the filtration was 40 to 60% by weight.

The washed polymer obtained in this manner was dried at 105° C. for 13 hours by a dryer. The yield of the granular polymer thus obtained was 93%, and the melt viscosity thereof was 81 Pa·s. The data of color tone, melt stability, crystallization temperature and content of a low-molecular weight component were shown in Table 1.

Comparative Example 3

1. Dehydration Step

A 20-liter autoclave (reactor) made of titanium was charged with 1,950 g of an aqueous sodium hydrosulfide (NaSH) solution [sulfur (S) content: 22.07 mol; analytical value of NaSH by a neutralization titration method: 61.86% by weight (21.52 mol); sodium sulfide ($Na_2S$) content: 0.55 mol] having an analytical value of 63.44% by weight as measured by iodimetry and 1,178 g of a 74.78% by weight aqueous sodium hydroxide (NaOH) solution (NaOH content: 22.02 mol) together with 6,700 g of NMP. NaOH/NaSH before dehydration is 1.02 (mol/mol), and NaOH/S is 1.00 (mol/mol).

After purged with nitrogen gas, the contents were gradually heated to 200° C. over 2.5 hours with stirring to distill off 901.0 g of water and 833.3 g of NMP. At this time, 0.39 mol of hydrogen sulfide ($H_2S$) was volatilized off. Accordingly, the amount of the available S in the reactor after the dehydration step was 21.68 mol. The amount of $H_2S$ volatilized off corresponded to 1.76 mol % based on the charged S in this step.

2. Charging Step

After the dehydration step, the reactor containing 21.68 mol of the available S was cooled to 170° C., 3,266 g [pDCB/available S=1.025 (mol/mol)] of pDCB, 2,262 g of NMP and 115 g [total water content in the reactor/available S=1.50

(mol/mol)] of water were added, and 35.6 g of NaOH having a purity of 97% was added in such a manner that (NaOH in the reactor/available S) is 1.100 (mol/mol). NaOH (0.78 mol) produced by volatilization of $H_2S$ is contained in the reactor.

3. Polymerization Step

While stirring the contents at 250 rpm by a stirrer installed in the reactor, a reaction was conducted at 220° C. for 1 hour, and the reaction mixture was then heated to 230° C. in 30 minutes to conduct the reaction at 230° C. for 1.5 hours (first-stage polymerization step; conversion of pDCB=about 92%). Thereafter, the number of revolutions of the stirrer was increased to 400 rpm, 441.3 g of water was charged under pressure into the reactor [total water content in the reactor/available S=2.63 (mol/mol)] while continuing the stirring, and the contents were heated to 255° C. to conduct a reaction for 4.0 hours (second-stage polymerization step).

4. Post Treatment Step

After completion of the reaction, the resultant polymer was washed in the same manner as in Example 1 to obtain a purified polymer. After completion of final washing with ion-exchanged water, a pH meter was placed into the washing liquid before filtration to measure a pH after 5 minutes. As a result, it was 11.8. The yield of the granular polymer thus obtained was 85%, and the melt viscosity thereof was 171 Pa·s. The data of color tone, melt stability, crystallization temperature and content of a low-molecular weight component were shown in Table 1.

Comparative Example 4

1. Dehydration Step

A 20-liter autoclave (reactor) made of titanium was charged with 1,790.7 g of an aqueous sodium hydrosulfide (NaSH) solution [sulfur (S) content: 19.84 mol; analytical value of NaSH by a neutralization titration method: 59.5% by weight (19.01 mol); sodium sulfide ($Na_2S$) content: 0.83 mol] having an analytical value of 62.12% by weight as measured by iodimetry and 1,028.7 g of a 73.95% by weight aqueous sodium hydroxide (NaOH) solution (NaOH content: 19.02 mol) together with 6,001 g of NMP. NaOH/NaSH before dehydration is 1.00 (mol/mol), and NaOH/S is 0.96 (mol/mol).

After purged with nitrogen gas, the contents were gradually heated to 200° C. over 2.5 hours with stirring to distill off 830.8 g of water and 782 g of NMP. At this time, 0.39 mol of hydrogen sulfide ($H_2S$) was volatilized off. Accordingly, the amount of the available S in the reactor after the dehydration step was 19.45 mol. The amount of $H_2S$ volatilized off corresponded to 1.98 mol % based on the charged S in this step.

2. Charging Step

After the dehydration step, the reactor containing 19.45 mol of the available S was cooled to 170° C., 2,902 g [pDCB/available S=1.015 (mol/mol)] of pDCB, 3,533.7 g of NMP and 170 g [total water content in the reactor/available S=1.70 (mol/mol)] of water were added, and 45.8 g of NaOH having a purity of 97% was added in such a manner that (NaOH in the reactor/available S) is 1.100 (mol/mol). NaOH (0.79 mol) produced by volatilization of $H_2S$ is contained in the reactor.

3. Polymerization Step

While stirring the contents at 250 rpm by a stirrer installed in the reactor, a reaction was conducted at 220° C. for 4.5 hours (first-stage polymerization step; conversion of pDCB=about 93%). Thereafter, the number of revolutions of the stirrer was increased to 400 rpm, 603 g of water was charged under pressure into the reactor [total water content in the reactor/available S=3.45 (mol/mol)] while continuing the stirring, and the contents were heated to 255° C. to conduct a reaction for 2.0 hours, and then cooled to 245° C. over 30 minutes to conduct a reaction for 11.5 hours (second-stage polymerization step).

4. Post Treatment Step

After completion of the reaction, the resultant polymer was washed in the same manner as in Example 1 to obtain a purified polymer. After completion of final washing with ion-exchanged water, a pH meter was placed into the washing, liquid before filtration to measure a pH after 5 minutes. As a result, it was 10.2. The yield of the granular polymer thus obtained was 80%, and the melt viscosity thereof was 470 Pa·s. The data of color tone, melt stability, crystallization temperature and content of a low-molecular weight component were shown in Table 1.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|
| pH of washing liquid at final washing stage | 10.7 | 9.9 | 9.7 | 10.0 | 9.5 | 8.9 | 12.5 | 3.8 | 11.8 | 10.2 |
| Melt viscosity (Pa·s) | 160 | 141 | 145 | 230 | 450 | 123 | 155 | 81 | 171 | 470 |
| Whiteness degree | 71 | 75 | 72 | 73 | 75 | 76 | 67 | 83 | 61 | 68 |
| Melt stability ($MV_2/MV_1$) | 0.93 | 0.99 | 0.95 | 0.92 | 0.88 | 0.99 | 0.78 | 0.74 | 0.79 | 0.75 |
| Resin pH | 11.2 | 10.5 | 10.8 | 10.9 | 8.0 | 7.9 | 12.7 | 6.1 | 12.1 | 11.5 |
| Crystallization temperature (° C.) | 204 | 196 | 208 | 195 | 177 | 202 | 200 | 247 | 217 | 198 |
| Amount of Soxhlet extraction (amount of low-molecular weight component) (% by weight) | 2.1 | 2.3 | 2.0 | 2.6 | 2.5 | 2.2 | 2.0 | 2.8 | 2.5 | 2.0 |

As apparent from the results shown in Table 1, it is understood that the PASs (Examples 1 to 5) according to the present invention have a resin pH ranging from 7.0 to 12.0, and are high in whiteness degree, excellent in melt stability and low in crystallization temperature.

On the other hand, when the pH of the washing liquid at the final washing stage is too high, the whiteness degree and melt stability are lowered (Comparative Example 1). When the pH of the washing liquid at the final washing stage is too low, the melt stability is lowered, and the crystallization temperature becomes high (Comparative Example 2). When the polymerization conditions for PAS do not fall within the range of the present invention, it is difficult to obtain a PAS excellent in whiteness degree and melt stability even when the pH of the washing liquid as the final washing stage is changed (Comparative Examples 3 and 4).

INDUSTRIAL APPLICABILITY

The poly(arylene sulfides) according to the present invention can be molded or formed into various injection-molded products or extruded products such as sheets, films, fibers and pipes either singly or by incorporating various kinds of inorganic fillers, fibrous fillers and/or various kinds of synthetic resins, if desired, as they are or after subjected to oxidative crosslinking. The poly(arylene sulfides) according to the present invention are particularly suitable for use in production of extruded products such as fibers because they are slow in crystallization speed and excellent in melt stability.

The invention claimed is:

1. A poly(arylene sulfide) having the following properties (a) to (f):
   (a) melt viscosity being 3 Pa·s to 2,000 Pa·s as measured under conditions of a temperature of 310° C. and a shear rate of 1,216 sec$^{-1}$;
   (b) pH being 7.5 to 11.5 as measured in a mixed solvent of water/acetone (volume ratio=2/1);
   (c) crystallization temperature being 165° C. to 220° C. as measured in the course of lowering the temperature of the polymer at a rate of 10° C./min from a molten state at a temperature of 340° C.;
   (d) whiteness degree being 70 to 85, wherein the whiteness degree indicates a color tone of a sample of a crystallized sheet of the poly(arylene sulfide) in accordance with a reflected light measuring method under conditions of standard light C;
   (e) a ratio $MV_2/MV_1$ being 0.85 to 1.0, wherein $MV_2$ is a melt viscosity value measured at a shear rate of 1,216 sec$^{-1}$ after held for 30 minutes at 310° C. and $MV_1$ is a melt viscosity value measured at a shear rate of 1,216 sec$^{-1}$ after held for 5 minutes at 310° C.; and
   (f) content of a low-molecular weight component extracted by Soxhlet extraction with chloroform being 1.0% to 4.0% by weight,
   wherein the poly(arylene sulfide) is produced by a production process comprising:
   (1) a dehydration step comprising heating and reacting a mixture containing an organic amide solvent, an alkali metal hydrosulfide and an alkali metal hydroxide in a proportion of 0.95 to 1.05 mol per mol of the alkali metal hydrosulfide at a temperature of 100 to 300° C. to discharge at least a part of a distillate containing water from the interior of the system containing the mixture to the exterior of the system;
   (2) a charging step comprising adding an alkali metal hydroxide and water to the mixture remaining in the system after the dehydration step, as needed, in such a manner that the alkali metal hydroxide and water are present in proportions of 1.00 to 1.09 mol and 0.5 to 2.0 mol, respectively, per mol of a sulfur source (charged sulfur source) including the alkali metal hydrosulfide and alkali metal sulfide, wherein the amount of the charged sulfur source is calculated in accordance with an equation: (Charged sulfur source)=(Total moles of sulfur charged)−(Moles of sulfur volatilized off after dehydration);
   (3) a polymerization step comprising a first-stage polymerization step of adding a dihalo-aromatic compound to the mixture to subject the sulfur source and the dihalo-aromatic compound to a polymerization reaction at a temperature of 170 to 270° C., thereby forming a prepolymer, wherein conversion of the dihalo-aromatic compound is 50 to 98%, and a second-stage polymerization step of controlling the amount of water in the reaction system after the first-stage polymerization step so water is present in a proportion of 2.0 to 10 mol per mol of the charged sulfur source, and heating the reaction system to 245 to 290° C., thereby continuing the polymerization reaction;
   (4) a washing step comprising washing a polymer formed in the polymerization step after the polymerization step repeatedly at least twice with a washing liquid composed of water, a hydrophilic organic solvent or a mixed liquid thereof, and at this time, washing the polymer with water or the mixed liquid at a final washing stage, and controlling washing conditions in such a manner that the pH of the washing liquid after the washing falls within a range of 8.5 to 10.7; and
   (5) a collecting step comprising separating the polymer from the washing liquid after the washing step.

2. The poly(arylene sulfide) according to claim 1, wherein the content of the low-molecular weight component extracted by Soxhlet extraction with chloroform is at most 3.0% by weight.

* * * * *